United States Patent [19]
Scheffer

[11] 3,745,886
[45] July 17, 1973

[54] THRUST PISTON MOTOR OPERATING WITH A GASEOUS FLUID MEDIUM

[75] Inventor: Harry Scheffer, Brackwede, Germany

[73] Assignee: Kruger, Harry, GmbH, Brackwede, Germany

[22] Filed: Mar. 31, 1971

[21] Appl. No.: 129,861

[30] Foreign Application Priority Data
Apr. 1, 1970 Germany............... P 20 15 472.7

[52] U.S. Cl. ................................................. 91/306
[51] Int. Cl. ............................................ F01l 25/06
[58] Field of Search ................................... 91/306

[56] References Cited
UNITED STATES PATENTS

| | | | |
|---|---|---|---|
| 50,218 | 10/1895 | Cameron | 91/306 |
| 544,476 | 8/1895 | Burham | 91/306 |
| 1,921,023 | 8/1933 | Chambers | 91/306 |
| 2,946,321 | 7/1960 | Liser | 91/306 |
| 3,405,606 | 10/1968 | Scheffer | 91/306 |

*Primary Examiner*—Paul E. Maslousky
*Attorney*—Beaman & Beaman

[57] ABSTRACT

A main valve for a thrust piston motor wherein two angled bores of the control piston of the main control valve terminatein the zone of a restriction of the piston in first and second radial outlet ports, the axial distance between which is substantially equal to the length of the restriction, and in that the slide carries in a zone of the restriction a displaceable control sleeve mounted thereon acting as a movable supplementary valve element, and so dimensioned that in one end position it closes the outlet of the first channel and opens the outlet of the second channel, and in the other end position it opens the outlet of the second channel and closes that of the first channel.

5 Claims, 5 Drawing Figures

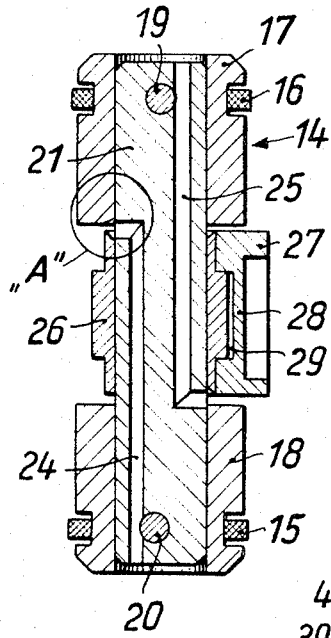
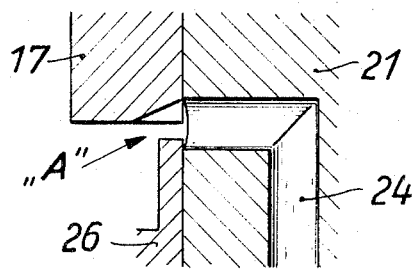
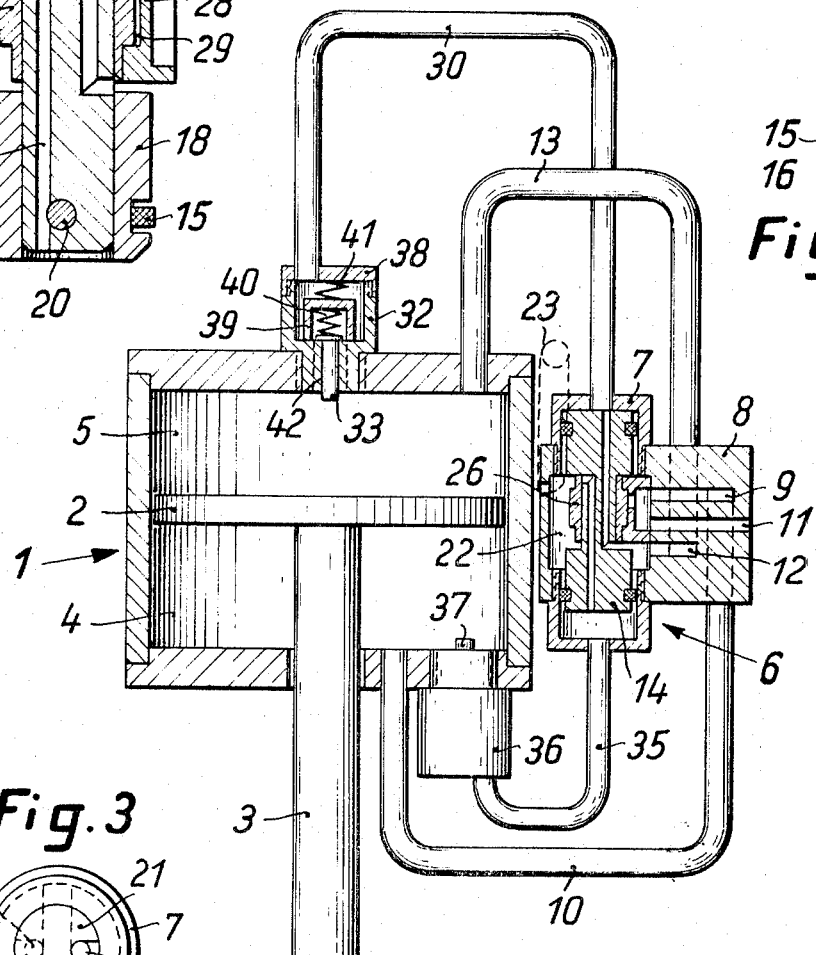
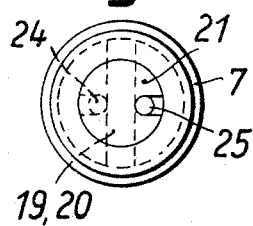

THRUST PISTON MOTOR OPERATING WITH A GASEOUS FLUID MEDIUM

BACKGROUND OF THE DISCLOSURE

The invention relates to a thrust piston motor operating with a gaseous fluid medium, and equipped with a control device consisting of a main control valve controlled by two normally closed auxiliary control valves, said main valve containing a control piston adapted to be displaced under the action of the flowing medium and a control slide, coupled to the control piston, for controlling the actuating mechanism of the motor piston, and wherein the control pressure chambers are each connected, through a bore in the control piston and through a supplementary valve means connected to the control piston, with the pressure medium source, and through one of the auxiliary control valves each with a low pressure zone.

In thrust piston motors of this kind it is necessary for the movement of the piston in both reversing positions to be initiated very quickly, and preferably very suddenly, so that the overall piston movement is a uniform one as a function of the time. The control devices required for this purpose must be robust and operationally reliable, and, above all, insensitive to changes in the viscosity of any lubricant contained in the form of a lubricant mist in the flowing gaseous medium, as well as to contamination of the medium.

PRIOR ART

It is already known to actuate thrust piston motors by means of control valves mounted laterally on the working piston, and the conduits for which are connected in a suitable manner with the cylinder chambers above and below the working piston. Such an arrangement is described, for example, in German Pat. No. 557 584.

The valve is constructed as a four-way slide valve, in which in one end position the slide connects the left side of the piston with the pressure source and the right side of the piston with the outlet in a low pressure zone, for example the ambient air, and in the other end position the right piston side with the pressure source and the left piston side with the outlet, so that the working piston moves correspondingly into one and the other end position. The slide of the valve, constructed as a piston, is operated by pressurising one piston end face by means of a manual control valve, and connecting the other with the low pressure ambient air.

However, the reversing of this known device is so slow that the working piston always remains in its two end positions for appreciable periods of time.

It is also known from German Specifications Nos. 1,230,263; 1,249,594 and 1,262,680 to carry out the reversal of the working piston from one end position into the other by using the piston itself. To this end, plunger valves are provided at the ends of the two cylinder chambers which communicate in a cross over manner with the two cylinder chambers above and below the control valve slide. The working piston controls in its two end positions the corresponding valve plunger in such a manner that the latter initiates its movement into the other end position. In order that the reversing of the main control valve, and thereby the reversing of the working piston into its other end position, takes place suddenly, the main control valve is provided with an auxiliary control element consisting either of a two-sided ball valve or a flat valve. This auxiliary control element responds very quickly during the reversal and causes an additional pressurisation of the corresponding piston end face of the main control valve plunger so that its movement into the other position is substantially accelerated during the reversal.

However, this operating principle and the means for applying it technically have disadvantages. As mentioned, the means must be very light to make possible extremely short switching times. This means that they are very sensitive to changes in the viscosity of lubricant residues and mainly also to the operationally unavoidable lubricant contamination. This is mainly due to the fact that the auxiliary control elements, i.e. both the ball and the valve flap, must be capable of opening and closing the valve opening in their direction of movement.

OBJECT OF THE INVENTION

The invention has the object of providing such a control device for a thrust piston motor with an auxiliary control element, which is insensitive to contamination and increases in the viscosity of the lubricant, and of improving the operating principle compared with these known constructions.

BRIEF SUMMARY OF THE INVENTION

According to the invention this object is realised in that two angular bores of the control piston of the main control valve terminate in the region of a restriction of this valve in first and second radial outlets, the axial distance between which is substantially equal to the length of the restriction, and in that a control sleeve is displaceably mounted on the slide in the zone of the restriction forming a movable supplementary valve element; the length of this control sleeve is such that in one end position it closes the outlet port of the first conduit and opens the outlet port of the second conduit, while in the other end position it opens the outlet port of the first conduit and closes the outlet port of the second conduit.

FURTHER FEATURES

According to a further feature of the invention, the main control valve slide has the same axial length as this supplementary control sleeve and is mounted thereon.

This is achieved according to the invention in that the control slide has a recess receiving a circumferential flange of the control sleeve.

According to a further feature of the invention, the control piston of the main control valve consists of a cylindrical core with two annular heads which are pushed onto the core and secured by transverse pins engaging into corresponding holes. The bores controlled by the control sleeve are located in the core, and their outlet ports are formed in the zone of the edges of the mutually facing end faces of the heads.

The advantages achieved by the invention consist mainly in that the control sleeve acting as the supplementary valve means does not cover the outlet ports in its direction of movement, but perpendicularly thereto, that is to say by a sliding movement. In this manner, this cover, i.e. the closing and opening of the outlet ports, is practically independent of the weight or mass of the supplementary valve element and depends only on the movement of the control sleeve on the restriction of the control slide of the main control valve, on which it is guided.

Preferably, the supplementary valve element does not correspond only when the control slide is to be operated. On the contrary it acts in a preparatory manner, after the termination of the last working cycle, to provide the pressure conditions for the next reversal in such a manner that this reversal is initiated without delay and at large power, as soon as the main piston gives the corresponding signal when it reaches its end position. In addition, the supplementary valve element according to the invention may be economically produced and assembled and is easily accessible when it has to be changed.

The arrangement of the slide in accordance with the invention ensures that the main control valve is automatically retained in its two working positions because the slide is attracted by the under pressure in its two positions, and thereby retains the valve slide until the same is suddenly forced to jump into its other position when a strong pressure is applied to the corresponding piston heads. Thus, the object of the quick reversal of the main piston from its end positions is achieved in a particularly advantageous manner.

DESCRIPTION OF DRAWINGS

The invention will be further described, by way of example, with reference to the accompanying drawings showing an embodiment thereof, and in which:

FIG. 1 shows the overall arrangement of the thrust piston motor;

FIG. 2 shows the slide of the main control valve according to the invention with its supplementary valve element in cross-section;

FIG. 2a shows a detail "A" of FIG. 2;

FIG. 2b shows a section of the sealing rings of FIGS. 1 and 2; and

FIG. 3 is a plan view of the slide of FIG. 2.

A working piston 2 with a piston rod 3 is guided in a working cylinder 1. The piston 2 divides the cylinder chamber into a lower chamber 4 and an upper chamber 5. A main control valve 6 is mounted on the cylinder 1. This main control valve consists of a valve cylinder 7 and a valve plate 8. The valve plate 8 contains three channels. The topmost channel 9 communicates through a conduit 10 with the lower cylinder chamber 4. The center channel 11 leads to a low pressure zone, in this example into the ambient air. The lower channel 12 communicates through a conduit 13 with the upper cylinder chamber 5.

A control piston 14 is adapted to slide in the valve cylinder 7. It is sealed against the cylinder wall by sealing rings 15 and 16. The valve slide 14 has an upper head 17 and a lower head 18. In the construction of FIG. 1 it is made in one piece. Preferably, however, the two heads are fitted into a core 21 by means of pins 19 and 20, as shown in FIG. 2. Between the heads 17 and 18 the slide has a smaller diameter. This restriction forms together with the cylinder walls a pressure chamber 22 which communicates with a gas pressure source, for example a source of compressed air, through a pressure conduit 23 shown in FIG. 1 by dotted lines.

According to the invention, the valve slide is provided with two angled bores. The first angled bore 24 extends from the lower end face of the slide in the longitudinal direction of the slide upwardly and then at a right angle thereto radially out of the slide, terminating below the upper head 17. The second angled bore 25 extends from the upper slide end face in the longitudinal direction of the slide downwardly and then at a right angle thereto out of the slide, terminating above the lower head 18.

A supplementary valve element in the form of a control sleeve 26 slides over the restriction of the control slide. This supplementary valve element is shown in FIG. 1 in its upper end position and in FIG. 2 in an intermediate position. The length of this element 26 is such that, in its upper position it opens the radial port of the angled bore 25 while closing the radial port of the angled bore 24. In its lower position, it correspondingly opens the radial port of the angled bore 24 and seals the radial port of the angled bore 25. The ends of the control sleeve 26 and of the heads 17, 18 have inwardly directed shoulders or chamfers (FIG. 2a), thereby reducing the seating surface on the heads 17 and 18 and improving the seat.

The control slide 27, alternatively connecting the conduits 9 and 12 in the valve plate with the outlet 11, has a recess 28 into which engages a flange 29 of the control sleeve 26. By means of this arrangement, the control slide 27 follows the movements of the control sleeve 26.

The upper pressure reversing chamber, formed in the upper part of the valve cylinder 17 communicates through a conduit 30 with an upper reversing valve 32. This valve is screwed into the upper end plate of the working cylinder 1. It terminates in an operating pin 33 which protrudes into the upper cylinder chamber 5.

The top of the reversing valve 32 is closed by a cap 38. Its interior is equipped with a sealing hood 39. The operating pin 33 is adapted to lift the sealing hood 39, but only after it has overcome the bias of a spring 40. A second spring 41 urges the sealing hood 39 on to its seat. Channels 42 connect the chamber formed inside the sealing hood 39 with the cylinder chamber 5.

When the interior of the reversing valve 32 is under pressure through the conduit 30 and the working piston 2 moves in the upward direction so that the upper cylinder chamber 5 and thus also the interior of the sealing hood 39, communicating therewith through channels 42, are depressurised, the sealing hood 39 is firmly pressed on to its seat. When the working piston 2 reaches the top end position and makes contact with the pin 33, the latter first compresses the spring 40. Then it lifts the sealing hood 39. As soon as the first leakage occurs past the sealing surface of the sealing hood 39, the pressures inside and outside the sealing hood are equalised and the biassing spring 40 throws it suddenly in the upward direction. In consequence, the chamber above the reversing piston is suddenly depressurised and the control piston, affected by pressure from the other side, jumps into its top position.

Thus, the reversing valve 32 gives rise to a snap effect in the action of the control piston 14.

The lower control pressure chamber, formed in the lower part of the control valve cylinder 7 of the main control valve 6 by the lower slide valve 18, communicates through a conduit 35 with a lower control valve 36, terminating by means of an operating pin 37 inside the lower cylinder chamber 4, and operating in exactly the same manner as the valve 32. When the operating pin 37 is operated by the piston 2, the valve connects the lower cylinder chamber 4 with the conduit 35.

OPERATION

When the thrust piston motor is in the position shown in FIG. 1, and the pressure source is connected, the lower cylinder chamber 4 is connected by the conduit 10, the channel 9 of the valve plate 8 and the control slide 17 with the outlet 11. The conduit 13, on the other hand, connects the upper cylinder chamber 5 through the pressure chamber 22 of the main control valve 6 with the pressure source 23. The control sleeve 26 which is in the upper position closes the lower control pressure chamber below the slide head 18. The valve 36 also closes the conduit 35 at its other end so as to capture the residual pressure remaining therein.

The upper control pressure chamber and the conduit 30, on the other hand, are pressurised from the pressure chamber 22 through the angled bore 25 opened by the control sleeve 26. However, this pressure remains ineffective, since on the one hand the pressure present in the conduit 35 offers an increasing resistance to a movement of the slide toward the bottom, and on the other hand the control slide 27, resting on top on the lower annular surface of the upper slide head 17, is affected from below by the pressure in the pressure chamber 22, while its inside communicates through the outlet 11 with the low pressure. The cross-sections are so dimensioned that the control slide does not move out its end position without the application of a comparatively large force.

When the piston 2 reaches its bottom position, it actuates the valve 36 and thereby through the pin 37 connects the lower control pressure chamber under the lower slide head 18 with the depressurised cylinder chamber 4. The pressure available by way of the angled bore 25 in the conduit 30, and in the upper control pressure chamber above the upper slide head 17 causes the slide to be suddenly thrown towards the bottom. During this action the lower control pressure chamber remains depressurised because during the downward acceleration the control sleeve 26 remains pressed towards the top, thereby keeping closed the connection between the lower control pressure chamber and the pressure chamber through the angled bore 24.

The control slide 27 now connects the lower cylinder chamber 4 through the pressure chamber 22 with the pressure source 23, and the upper cylinder chamber 5 with the outlet 11. The working piston 2 suddenly reverses its direction of movement and goes towards the top.

First, the pressure in the conduit 35 and in the lower control pressure chamber is again built up through the still open reversing valve 36. Then the valve 36 closes again.

The violent downward movement of the control piston of the main control valve 6 is taken up by impinging on the lower end wall of the cylinder 7. The kinetic energy still available in the control sleeve 26 forces the control sleeve to travel further until it closes the angled bore 25 and opens the angled bore 24. After the initiation of the upward movement of the working piston, the conduit 35 is again preparatorily pressurised through the valve 36.

Now, also the upper control pressure chamber above the upper slide head 17 is still affected by the previous pressure which is captured in the conduit 30, by the closed valve 32. The control piston is therefore under full pressure from the top, from the bottom, and in the restriction. This pressure equalization is further enchanced by the fact that the sealing rings 15 and 16 have such a construction that they do not close over the whole annular surface. As shown in FIG. 2b there is a certain play, i.e. a certain lack of seal, in order to balance leakage losses.

Thus, although the control piston 14 is under pressure from all sides it remains in its position because now the control slide 27 rests on the lower slide head and the pressure in the pressure chamber 22 becomes effective from the top, while its interior is depressurised through the outlet 11.

Even when the thrust piston motor has been out of operation for a long period and the slide of the control valve has stopped in any position, it will return back to its end positions after not more than one operational cycle of the working piston.

When the piston 2 reaches its terminal top position, it relieves the upper control pressure chamber above the slide head 17 through the valve 32, and the cycle starts again.

I claim:

1. A reversible piston motor comprising, in combination, a main control valve controlled by two normally closed auxiliary control valves, said main control valve having a body, a chamber defined in said body having a central region, ports defined in said body intersecting said chamber central region, a control piston having opposite ends each communicating with an auxiliary valve and reciprocably mounted in said chamber, sealing means defined on said piston adjacent each end sealingly cooperating with said chamber, an annular control sleeve reciprocably mounted on said control piston for movement thereon in the direction of movement of said control piston and located within said central chamber, abutment means defined on said control piston limiting movement of said control sleeve thereon between first and second positions, a control slide mounted on said control sleeve adapted to selectively close said ports at selected positions of said control piston and said control sleeve, first and second passages defined in said control piston each communicating with a control piston end, first and second orifices defined in said control piston communicating with said first and second passages, respectively, and selectively communicating with said chamber central region, said control sleeve substantially closing said first orifice to said central region at said control sleeve first position and opening said second orifice to said central region, and substantially closing said second orifice to said central region at said control sleeve second position and opening said first orifice to said central region.

2. In a reversible piston motor as in claim 1, an annular central portion of reduced transverse cross-sectional dimension defined on said control piston defined by axially spaced radially extending surfaces constituting said abutment means, said control sleeve being reciprocably mounted on said central portion, and said first and second orifices intersecting said central portion.

3. In a reversible piston motor as in claim 2, wherein said orifices each intersect said central portion adjacent different radially extending surfaces.

4. In a reversible piston motor as in claim 1, wherein said control slide has an axial length substantially equal to the axial length of said control sleeve.

5. A control for a reversible piston motor as in claim 1, wherein said control sleeve includes a peripheral flange and said control slide includes a recess receiving said flange.

* * * * *